United States Patent [19]

Onda

[11] 4,294,296
[45] Oct. 13, 1981

[54] CARPENTER PLANER

[75] Inventor: Hirotsuga Onda, Seki, Japan

[73] Assignee: Onda Ironworks Company, Limited, Gifu, Japan

[21] Appl. No.: 78,312

[22] Filed: Sep. 21, 1979

[51] Int. Cl.³ .............................................. B27C 1/12
[52] U.S. Cl. .................................. 144/120; 144/3 A
[58] Field of Search ................... 144/114 R, 130, 115, 144/120, 155, 162 R, 182, 184, 323, 3 A

[56] References Cited

U.S. PATENT DOCUMENTS 3,727,654 4/1973 Mochizuki .......................... 144/220
4,249,584 2/1981 Onda ................................... 144/3 A Primary Examiner—W. D. Bray Attorney, Agent, or Firm—Jordan and Hamburg

[57] ABSTRACT

Herein disclosed is a carpenter planer in which a stock is cut during the reciprocative motion on a stock feeding table. The stock to be cut is reciprocated by a stock feeding unit above the stock feeding table, which is driven by a reversible motor. A detector for detecting the passage of the stock to change the forward or reverse rotation of the motor is provided on the side of the feeding table. The detector is adapted to emit a signal toward the side of the stock and to receive the reflected signal from the stock. With the detector is connected a timer for preventing the detector from malfunction even if the reflected signal has not been received by the detector for a predetermined period of time due to irregular reflection of the signal on the stock.

6 Claims, 5 Drawing Figures

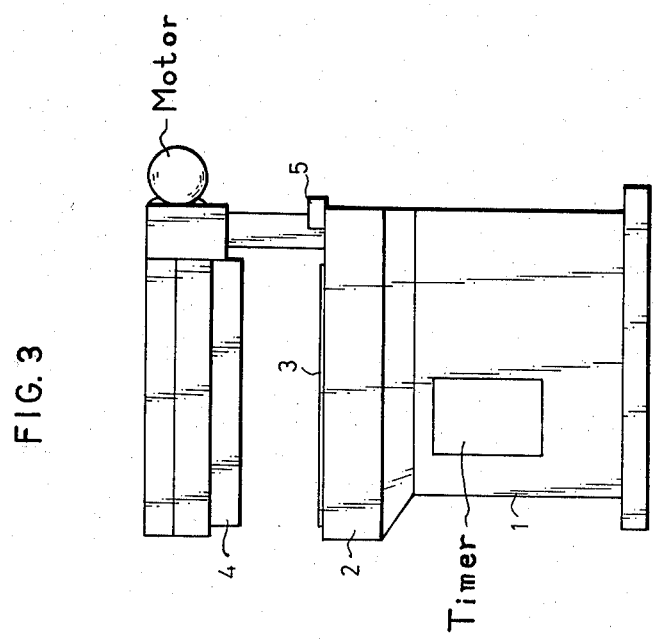

CARPENTER PLANER

FIELD OF THE INVENTION

The present invention relates to a carpenter planer in which a stock is cut during the forward and backward movements thereof on a stock feeding table.

BACKGROUND OF THE INVENTION

Limit switches or phototubes having a light source and a light detector which receives the light from the light source are generally used for detecting the passage of a stock to be cut in a carpenter planer. The use of such a type of phototubes, however, involves the limitation of the width of the stock to be cut although the stock is fed on a feeding table having an open edge. As a result, reflection type optical detectors have been recently adopted which are not subjected to this limitation. The reflection type optical detector, however, has another disadvantage that the passage of a stock to be cut may not be accurately detected when the stock has a mortise or rough surface.

OBJECTS OF THE INVENTION

It is an object of the invention to provide a carpenter planer in which the passage of a stock to be cut may be accurately detected without malfunction.

It is another object of the invention to provide a carpenter planer in which an electric current for reversing an electric motor in each planing operation is applied to the motor after the motor is perfectly stopped so that the burn-out of the motor may be prevented.

Other and further objects of this invention will become clear upon an understanding of the illustrative embodiments which are described or will be indicated in the appended claims, and various advantages are not referred to herein will occur to one skilled in the art upon employment of the invention in practice.

BRIEF DESCRIPTION OF THE DRAWINGS

FIG. 3 is a side view of the carpenter planer shown in FIG. 1.

DESCRIPTION OF THE PREFERRED EMBODIMENTS

Figure 1:
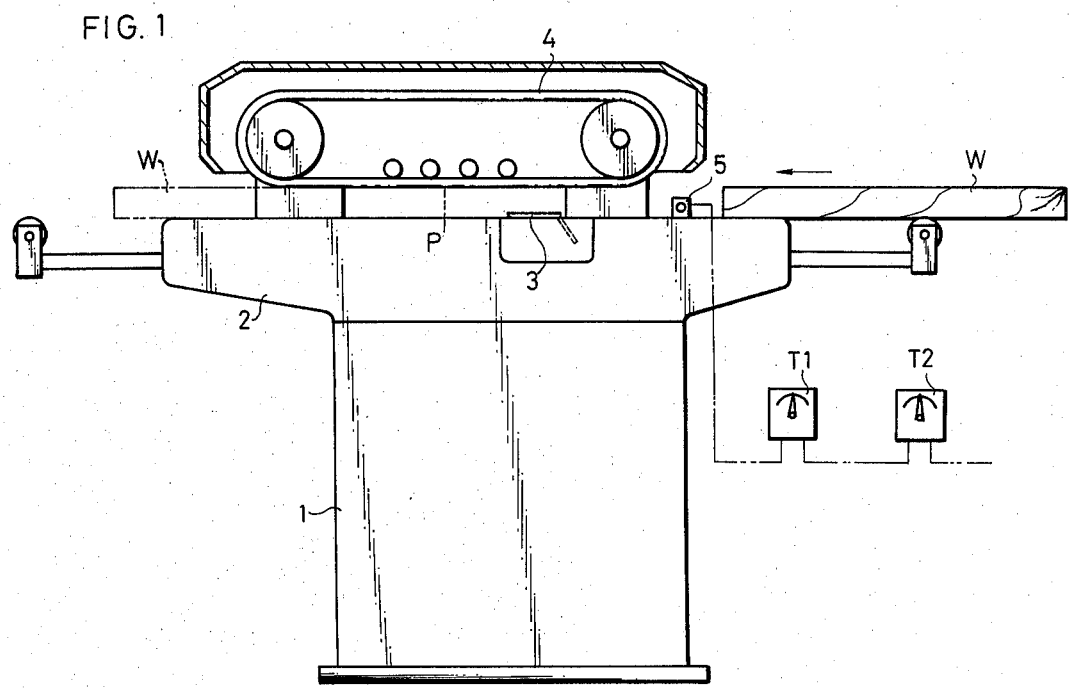
FIG. 1 is a schematic elevational view showing an embodiment of a carpenter superfinishing planer embodying the present invention.

A carpenter superfinishing planer embodying the present invention will now be described with reference to the accompanying drawings. Reference numeral 1 represents a planer base, 2 a stock feeding table, and 3 a planer blade. Reference numeral 4 represents a feeding belt, which is disposed above the feeding table 2 and adjustable in vertical position and can be rotated in forward and reverse directions by a reversible motor.

A detector 5 is disposed at one side of a loading station (right side of FIG. 1) of the stock feeding table. The detector 5 comprises a high frequency wave generator which emits the waves toward the stock W which is being fed and a detecting means which receives the reflected waves for detecting the passage of the stock. Alternatively the detector 5 may comprise a light source such as a light emitting diode and a light receiving element such as a photo-transistor. Light from a light source would be reflected by the stock W to be cut when the stock W passes. The reflected light may be detected by the light receiving element.

A control timer T1 is connected between the detector 5 and a reversing timer T2. The control timer T1 starts to count when the detector 5 has stopped receiving reflected waves from the stock due to irregular reflection of waves on the rough surface of the stock W while the detector 5 detects the stock W. The timer T1 resets when the detector 5 again detects the normally reflected waves from the stock W within a predetermined period of time t1. Thus, the detector 5 also receives no reflected waves and starts to count when the stock W loaded at a loading station of the feeding table 2 passes the detector 5. When a predetermined period of time t1 has passed since the completion of the reception of reflected waves, the detector 5 turns off a power supply for the motor and simultaneously starts the reversing timer T2. While the timer T1 is counting, the motor is still moving to transfer the stock W. Namely, the stock W is transferred within the time t1 from the position in front of the detector 5 to a position P. The motor is turned off at the position P, so that the stock W is slightly moved further over the position P and is stopped at a reversing station.

The reversing timer T2 is adapted to reverse the motor after the lapse of a predetermined period of time t2, which starts to count when the power supply has been turned off to deenergize the motor at the end of the predetermined counts of the timer T1.

The operation of the carpenter superfinishing planer thus constructed will now be explained.

Figure 2A:
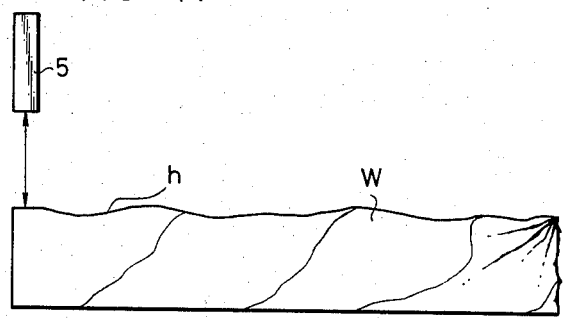
FIGS. 2(a), 2(b) and 2(c) are explanational views for illustration of the respective detection conditions of a stock to be cut.

The motor for driving the stock feeding belt 4 is rotated by turning on a main power switch. The stock W to be cut is fed so that it passes the detector 5. The high frequency waves emitted from the detector 5 impinge upon the side (detected surface) of the stock W. The waves are normally reflected to return to the detector 5 when the detected surface is oriented normal to the emission direction of the high frequency waves as shown in FIG. 2(a). Consequently, the control timer T1 is kept in condition to start counting.

Figure 2B:
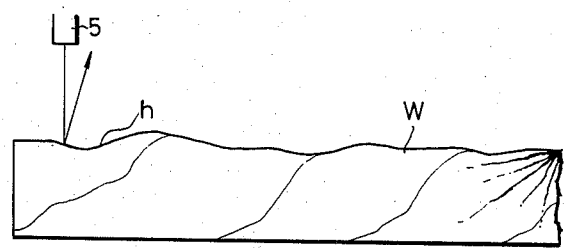
Figure 2C:
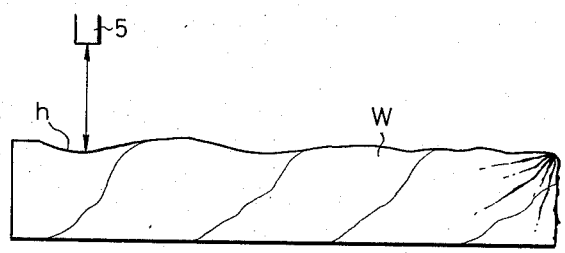

The stock W is moved slightly by the stock feeding belt 4. The high frequency waves will not return to the detector 5 as shown in FIG. 2(b), when the high frequency waves impinge upon concave h or convex to cause irregular reflection. The control timer T1 starts to count. The stock W is further moved, and when the high frequency waves impinge normally upon the detected surface of the stock as shown in FIG. 2(c), the high frequency waves are normally reflected to return to the detector 5. The control timer T1 will be reset.

Then after the stock W has completely passed the detector 5, the detector 5 receives no reflected waves. The control timer t1 starts to count. When a predetermined period of time T1 has passed, the control timer T1 counts up to the full counts to turn off the power supply for motor. The stock W begins to stop at position P in FIG. 1. Simultaneously the reversing timer T2 is started to count. Before the time t2 has elapsed, the motor is entirely stopped. Thereafter, the reversing timer T2 counts up to full counts and operates to reverse the motor. This causes the stock W to return to the loading station.

Accordingly the passage of the stock on the stock feeding table 2 can be accurately detected even if the reflected waves have not been received by the detector for a predetermined period of time due to rough surface or mortise of the stock, so that the stock W can be transferred to the receiving station without fail. As stated above, the motor is rotated by the timer T2 into reverse direction to return the stock W to the loading station. In this case, when the stock W has passed the detector 5, the timer T1 and then the timer T2 operate again as explained before. Thus, the next cutting work is made possible.

In the above-mentioned embodiment, the motor is adapted to reverse after the lapse of a predetermined time t2 since the motor began to stop. Therefore, while the motor is rotating, electric current for reversing the motor in another direction is not applied, and burn out of the motor or solenoid switch may thus be positively prevented.

In the embodiment, the power supply for the motor is turned off by the control timer T1 when the stock W has passed the planer blade 3. The preset time of the timer T1 may be set slightly longer than the time required for the rough surface of the stock to pass the detector 5 since the timer T1 of the invention is to compensate for failure to receive reflected waves due to irregular reflection on the stock W. In this case an additional timer (not shown) for turning off the power supply of the motor when the stock W passed the planer blade 3 would be connected with the timer T1.

The detector 5 may be provided at the rear of the planer blade 3. In this case the preset time t1 for control timer T1 would be made shorter.

The planer blade 3 may be rotary so that the cutting of the stock may be accomplished also during returning movement.

Although the invention has been described in its most preferred form with a certain degree of particularity, it is understood that many apparently widely different embodiments of this invention may be made without departing from the spirit and scope thereof and that the invention is not limited to the specific embodiment thereof except as defined in the appended claim.

What is claimed is:

1. A carpenter planer comprising a planer base, a stock feeding table provided on the planer base, a stock feeding unit connected to and situated above the stock feeding table and spaced therefrom, said stock feeding unit having an endless belt and a reversible motor for rotating the endless belt back and forth, a planer blade situated in the stock feeding table and slightly projecting therefrom, detecting means for detecting passage of stock moved on the stock feeding table by the endless belt of the stock feeding unit, and timing means actuated by said detecting means, said timing means controlling the motor so that after the stock is completely passed over the planer blade, the motor is stopped and then the motor is reversely actuated to return the stock to a first position.

2. A carpenter planer according to claim 1, in which said timing means comprises first and second timers, said first timer being electrically connected to the detecting means and adapted to start counting when the timer does not receive a signal from the detecting means, said first timer being reset to again start counting when the first timer again receives a signal from the detecting means within a predetermined time.

3. A carpenter planer according to claim 2, in which said first timer is electrically connected to the second timer, said first timer being adapted to stop the motor of the stock feeding unit and to start counting of the second timer after the predetermined time has passed without receiving the signal from the detecting means.

4. A carpenter planer according to claim 3, in which said second timer is electrically connected to said reversible motor of the stock feeding unit to reversely rotate the motor after a predetermined time set by the second timer has passed, so that the motor can be reversed after the motor is completely stopped.

5. A carpenter planer according to claim 1, in which said detecting means is situated on said stock feeding table, said detecting means emitting signals to a side surface of the stock passing in front of the detecting means and receiving the signals reflected by the side surface, said reflected signals being transmitted to said timing means.

6. A carpenter planer according to claim 5, in which said detecting means is provided at a stock feeding side of the stock feeding table.

* * * * *